United States Patent [19]
Suzuki et al.

[11] 4,051,514
[45] Sept. 27, 1977

[54] HIGH-VOLTAGE CIRCUIT FOR POST FOCUSING TYPE COLOR PICTURE TUBE

[75] Inventors: Nobuyuki Suzuki; Toyotaro Nishihara, both of Yokohama, Japan

[73] Assignee: Hitachi, Ltd., Japan

[21] Appl. No.: 492,926

[22] Filed: July 29, 1974

[30] Foreign Application Priority Data

July 31, 1973 Japan .................. 48-85385

[51] Int. Cl.² .................. H04N 9/20; H01J 29/08
[52] U.S. Cl. .................. 358/65; 358/74; 315/411
[58] Field of Search .......... 358/74, 73, 65, 64, 358/190; 315/411, 405; 178/DIG. 11, 7.3 R, 7.5 R

[56] References Cited
U.S. PATENT DOCUMENTS

| | | | |
|---|---|---|---|
| 3,176,185 | 3/1965 | Inaba et al. | 358/65 |
| 3,274,336 | 9/1966 | Pietrolewicz | 315/411 |
| 3,432,718 | 3/1969 | Preisig | 315/411 |
| 3,500,116 | 3/1970 | Rietveld et al. | 315/405 |
| 3,665,288 | 5/1972 | Godawski | 315/405 |
| 3,700,959 | 10/1972 | Sakurai | 315/411 |
| 3,786,299 | 1/1974 | Martin | 315/411 |
| 3,803,446 | 4/1974 | Faglioni | 178/DIG. 11 |
| 3,846,666 | 11/1974 | Suzuki et al. | 315/411 |

*Primary Examiner*—John C. Martin
*Attorney, Agent, or Firm*—Craig & Antonelli

[57] ABSTRACT

A high-voltage circuit for post focusing type color picture tube is disclosed in which a high voltage and a higher voltage are produced respectively from the middle and final stages of a voltage-multiplying rectifier circuit connected to the output winding of a fly-back transformer. The voltage-multiplying rectifier circuit comprises a plurality of rectifier elements and a plurality of capacitor elements. The fly-back transformer has its leakage inductance and the like adjusted so as to be tuned to the 7th or higher-order harmonic of fly-back pulses.

28 Claims, 26 Drawing Figures

HIGH-VOLTAGE CIRCUIT FOR POST FOCUSING TYPE COLOR PICTURE TUBE

BACKGROUND OF THE INVENTION

1. Field of the Invention

This invention relates to a high-voltage circuit for a post focusing type color picture tube or more in particular to a high-voltage circuit the output voltage of which undergoes little variations against load variations.

2. Description of the Prior Art

In conventional color picture tubes of shadow mask type, the amount of electron beams transmissible through the shadow mask is limited and therefore, if the brightness of the phosphor screen is to be increased, the velocity of electrons constituting the beams must be increased, that is to say, the high voltage applied to the anode must be made higher. Increasing the voltage applied to the anode makes it necessary to increase the deflection power, which in turn requires a higher power of the deflection output circuit.

The color picture tube of post focusing type has been developed to increase the brightness without increasing the anode voltage or deflection power required. This post focusing type color picture tube is such that the phosphor screen and the shadow mask are electrically insulated from each other and impressed with different voltages. The color picture tube of this type is also characterized by an anode provided at the funnel section. Thereby, the rate of transmission of electron beams through the shadow mask is increased, thus making it possible to obtain a high brightness without increasing the high voltage applied to the phosphor screen.

In the color picture tube of this type, the relations $Em \approx Ef$ and $Eb > Em$ are established, where $Em$ is the voltage applied to the shadow mask, $Ef$ the voltage applied to the anode of the funnel section, and $Eb$ the voltage applied to the phosphor screen. $Eb$ being substantially at the same level as the anode voltage of the conventional color picture of shadow mask type. Since the voltage of the funnel section anode contributing to deflection is lower than the anode voltage of the conventional shadow mask type color picture tube, a smaller deflection power than conventionally needed suffices. It is necessary, however, to maintain both $Eb/Em$ and $Eb/Ef$ constant for the reason that if the brightness is changed by a brightness adjustment process or if $Eb/Em$ or $Eb/Ef$ changes for lack of uniformity of characteristics of component elements, the post focusing cannot be effected as required, resulting in the deterioration of color purity. The variations allowable for $Eb/Em$ and $Eb/Ef$ are very slight, making design and adjustment of the high voltage circuit of the color picture tube very much complicated.

SUMMARY OF THE INVENTION

An object of the present invention is to provide a high voltage output circuit with little variations in output voltage.

Another object of the invention is to provide a high voltage output circuit for the color picture tube in which the ratio of the voltage of the phosphor screen $Eb$ to the shadow mask voltage $Em$ and the ratio of the phosphor screen voltage $Eb$ to the funnel section anode voltage $Ef$ are maintained constant.

In order to achieve the above-described objects, the high voltage circuit according to the present invention comprises a voltage-multiplying rectifier circuit including a plurality of rectifier elements and a plurality of capacitor elements for producing a high voltage at the final stage and middle stage terminals thereof and a fly-back transformer with its secondary winding connected to the voltage-multiplying rectifier circuit, characterized in that the fly-back transformer including circuits connected to the secondary winding thereof and the leakage inductance thereof are so constructed as to be tuned to higher harmonics of a frequency which is an odd-number times higher than the fundamental frequency of fly-back pulses.

BRIEF DESCRIPTION OF THE DRAWING

FIG. 13b is a circuit diagram showing an actual example of the embodiment of FIG. 13a.

FIGS. 14 and 15 are circuit diagrams showing other actual examples of the circuits shown in FIG. 13a.

DESCRIPTION OF THE PREFERRED EMBODIMENTS

Figure 1:
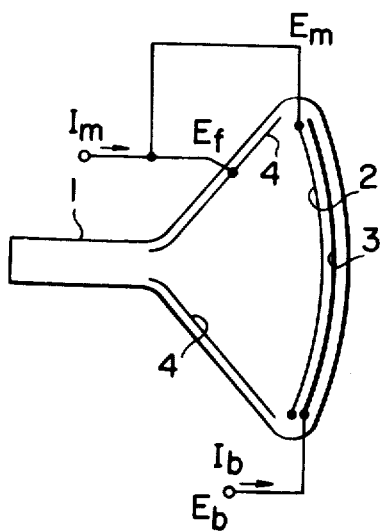
FIG. 1 is a schematic diagram showing the post focusing type color picture tube used in the present invention.

A color picture tube of post focusing type suitably using the high voltage circuit according to the present invention is shown schematically in FIG. 1. Voltage $Eb$ is applied to a phosphor screen 3 of a color picture tube 1. The voltages $Em$ and $Ef$, which may be at the same level as shown in the drawing, are applied to the shadow mask 2 and the funnel section anode 4 respectively.

Figure 2:
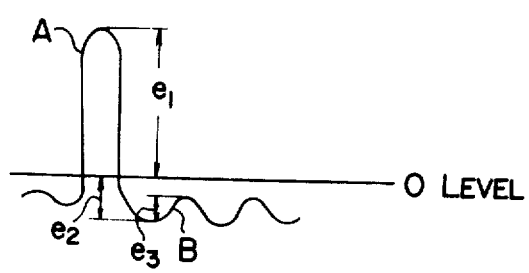
FIG. 2 is a diagram showing an ordinary waveform generated on the secondary side of the fly-back transformer.

Referring to FIG. 2 showing an example of the voltage waveform on the secondary side of the fly-back transformer, the waveform contains a fly-back pulse A and a ringing B. The crest value of fly-back pulse A is expressed as $e_1 + e_2$ and the amplitude of the ringing B as $e_3$.

The waveforms of the fly-back pulse A and the ringing B depend on the characteristics of the fly-back transformer, that is, on the order of the higher harmonics associated with the fundamental frequency of about 92.5 KHz of the fly-back pulse to which the resonance frequency of a resonance circuit due to the leakage inductance and distributed capacity of the fly-back transformer, i.e. the parasitic constant, is to be tuned and also on the order by which the voltage is multiplied in the rectifier circuit connected to the secondary side of the fly-back transformer. Even when the fly-back transformer is so designed as to minimize the ringing B, the amplitude $e_3$ thereof, though small, remains unremoved due to variations in the value of leakage inductance, capacitance of the rectifier circuit or the capacitance and inductance of the primary side of the fly-back transformer.

Figure 3:
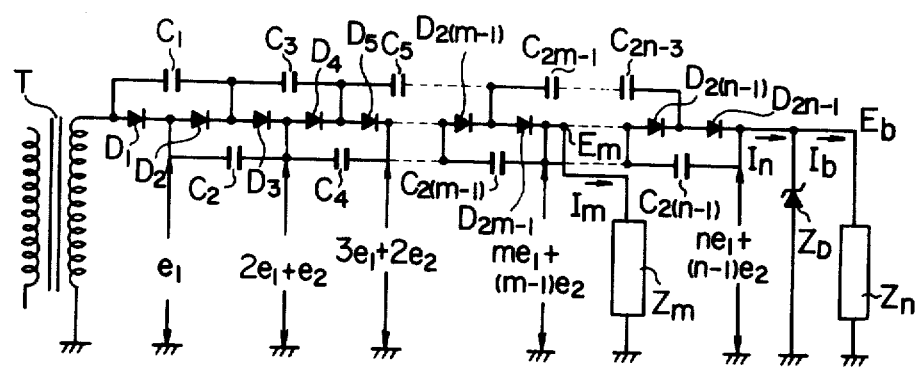
FIG. 3 is a fundamental circuit diagram showing an $n$-times voltage-multiplying rectifier circuit according to an embodiment of the invention.

In FIG. 3 showing a circuit diagram according to an embodiment of the invention, a rectifier circuit connected to the secondary of the fly-back transformer and a load equivalently expressed are illustrated. Symbol T shows a fly-back transformer the primary winding of which is connected to a horizontal deflection output transistor not shown. Capacitors $C_1$ to $C_{2(n-1)}$ and diodes $D_1$ to $D_{2(n-1)}$ are connected in multiple stages and make up a voltage-multiplying rectifier circuit. Symbol Zn shows a high voltage load equivalent to the phosphor screen of the color picture tube, and Zm another high voltage load equivalent to the funnel section anode and the shadow mask. Signal ZD a high-voltage stabilizing element having constant-voltage characteristics similar to those of a constant voltage diode.

In the absence of the high-voltage stabilizing element ZD in the $n$-times voltage multiplying rectifier circuit as mentioned above, the output voltage $Eb$ at the final stage and the output voltage $Em$ at the $m$-th stage of the rectifier circuit are expressed as follows:

$$Eb = ne_1 + (n - 1)e_2 \quad (1)$$

$$Em = me_1 + (m - 1)e_2 \quad (2)$$

where $n$ and $m$ are the numbers of the order by which the voltage is multiplied in the voltage-multiplying rectifier circuit; and $e_1$ and $e_2$ the amplitudes of the waves as mentioned already with reference to FIG. 2.

The ratio between the voltages of equations (1) and (2) above is $$\frac{Eb}{Em} = \frac{n + (n - 1)e_2/e_1}{m + (m - 1)e_2/e_1} \quad (3)$$

Figure 4A:
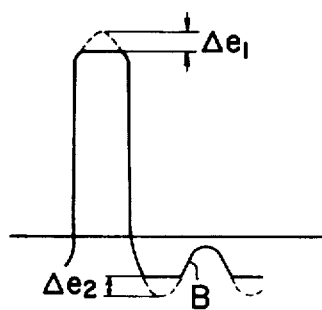
FIGS. 4a and 4b show waveforms on the secondary side of the fly-back transformer for explaining the operation thereof.

Assume that the high voltage load Zm changes. Different tuning conditions for higher harmonics must be met, thus changing the waveform of the ringing B as shown in FIG. 4a. This changes $e_2$, which in turn causes $e_2/e_1$ to be changed, resulting in the ratio between the high and middle high voltages obtained from equation (3) above. By connecting a high voltage stabilizing element ZD between the output of the final stage and the earth as shown in FIG. 3, the load of the high voltage output is rendered substantially uniform, so that neither $e_1$ nor $e_2$ undergoes any change against a change in the load Zm.

In the television receiver using a post focusing type color picture tube, the relation between the current $Ib$ flowing in the phosphor screen and the current $Im$ flowing in the shadow mask at a minimum brightness is expressed as $Ib = Im = 0$. Therefore, when the brightness changes from its minimum to maximum, the load variations of the high voltage output of the rectifier circuit are as follows:

1. In the absence of the high voltage stabilizing element ZD:
   from zero output for minimum brightness to output of $Eb \cdot Ibmax + Em \cdot Inmax$ for maximum brightness.

2. In the presence of the high voltage stabilizing element ZD inserted:

from $Eb \cdot In$ for minimum brightness to the output of $Eb \cdot Im + Em \cdot Inmax$ for maximum brightness, where In shows the load current of the output of the final stage of the rectifier circuit.

Generally, $In \geq Ibmax$, and therefore $Eb \cdot In > Em \cdot Immax$. This shows that the apparent load variations are much smaller when the high voltage stabilizing element ZD is inserted.

Figure 4B:
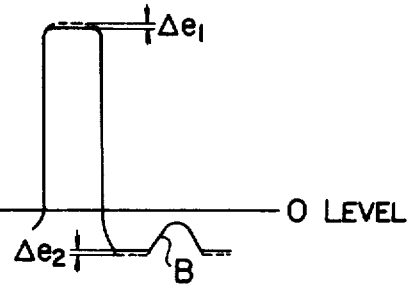

It will also be noted from the voltage diagram of FIG. 4b that when the same amount of load variation is involved, there are less changes in $e_1$ and $e_2$ and hence $Eb$ and $Em$ when the load change begins with a certain significant load amount as shown in FIG. 4b than when the load begins to change from the zero level as in the case of FIG. 4a. This is due to the fact that in the presence of a certain significant amount of load applied by the high voltage stabilizing element or the like, the conduction period of the diodes of the voltage multiplying rectifier circuit is longer, with the result that it is more difficult for $e_1$ and $e_2$ to change against load variations as is obvious from FIG. 4b.

Therefore, by preloading the circuit with the high voltage stabilizing element ZD inserted therein, variations of $e_1$ and $e_2$ can be minimized, thereby making it possible to realize a circuit with a uniform ratio between high voltage Eb and middle high voltage $Em (= Ef)$.

Figure 5A:
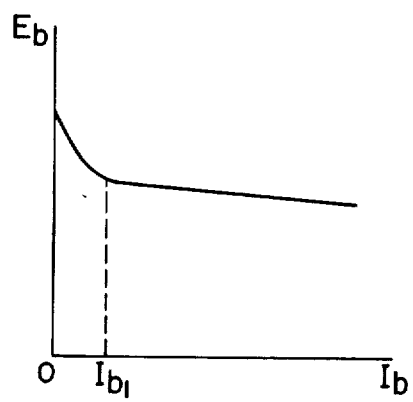
FIGS. 5a, 5b and 5c show high voltage output characteristics diagrams for explaining the operation of the circuit of FIG. 3.

If the circuit of FIG. 3 is so constructed that the high voltage stabilizing element ZD is removed from the output of the voltage-multiplying rectifier circuit and a high voltage circuit is formed which is adapted to be tuned to higher harmonics of the 5th or higher order, the regulation characteristics of high voltage output and output current as shown in FIG. 5a is obtained on the basis of the waveforms produced on the primary and secondary sides of the fly-back transformer and on the basis of the energy stored in the circuits in the primary and secondary sides thereof. As shown in FIG. 6, a high-valued resistor 5 is connected to the output of the final stage of the voltage-multiplying rectifier and current $Ib_1$ corresponding to the point of inflection of the characteristics curve of FIG. 5a is made to flow in the resistor 5, so that a better regulation characteristic of the high voltage output as shown in FIG. 5b is obtained.

Figure 5B:
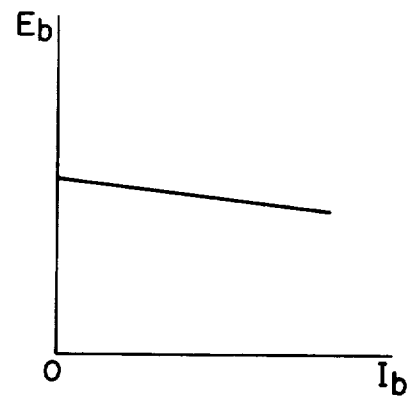
Figure 6:
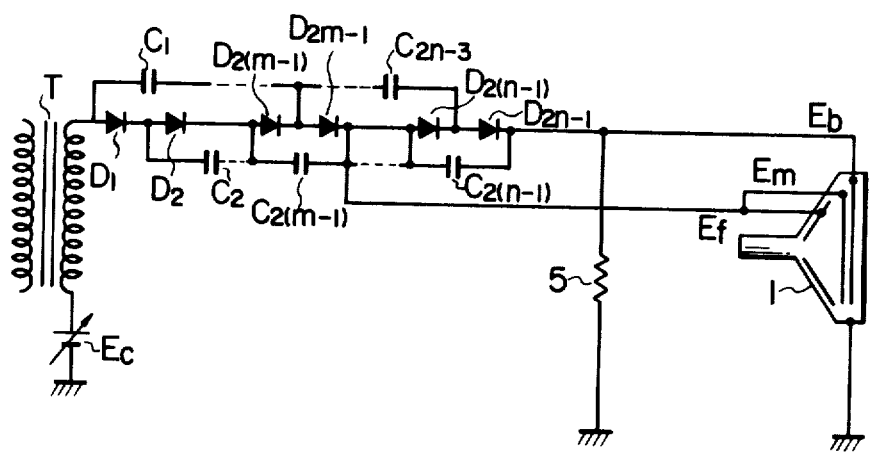
FIG. 6 is a circuit diagram showing another embodiment of the invention.

The high-valued resistor 5 inserted in the circuit of FIG. 6 is only an example of the means for providing a load for the fly-back transformer and, alternatively, a load equivalent to $Eb \cdot Ib_1$ may be provided through a high-valued resistor or a high-voltage stabilizing element from a given DC voltage section of the voltage-multiplying rectifier circuit thereby to achieve the characteristics similar to that shown in FIG. 5b. As another possible method for obtaining a similar characteristics curve, a high-valued resistor or high voltage stabilizing element may be inserted between different DC voltage sections or between a DC voltage section and the earth, even though it is more convenient for measurement and other purposes if a high-voltage stabilization element is inserted between DC voltage section and the earth.

FIG. 5a is a typical qualitative representation of a characteristic associated with the higher harmonics tuning of the fly-back transformer. In fact, the regulation characteristics are different for different tuning methods as shown in FIG. 5c where curves 7, 8 and 9 indicate $Eb - Ib$ characteristics of the higher harmonic tuning of the 5th, 7th and 9th or higher order respectively.

Generally, it is known from experiments that the higher-harmonics tuning of odd-numbered orders such as 3rd, 5th, 7th, 9th, 13th and so on is accompanied by a less ringing B for the horizontal scanning period, resulting in superior high voltage regulation characteristics. Especially, the amplitude $e_3$ of the ringing B is quite small for a higher harmonic tuning system of the 9th or higher order. When the higher harmonic tuning of the 9th or higher order is involved, a higher harmonic which is superimposed on the sinusoidal wave of fundamental frequency to obtain the fly-back pulse A has a small amplitude compared with that of the fundamental wave. Therefore, departure from a tuning order results in no great change in waveform of the fly-back pulse nor great increase in amplitude $e_3$ of the ringing B, thus leading to a superior high-voltage regulation characteristics as represented by 9 in FIG. 5c.

Also in the higher harmonic tuning of the 9th or higher order, better high voltage regulation characteristics are achieved for the 9th, 11th, 13th or other odd-numbered order than for an even-numbered order, even though the difference by which one is better than the other in high voltage regulation characteristic becomes less the higher the order of the higher harmonic.

Figure 5C:
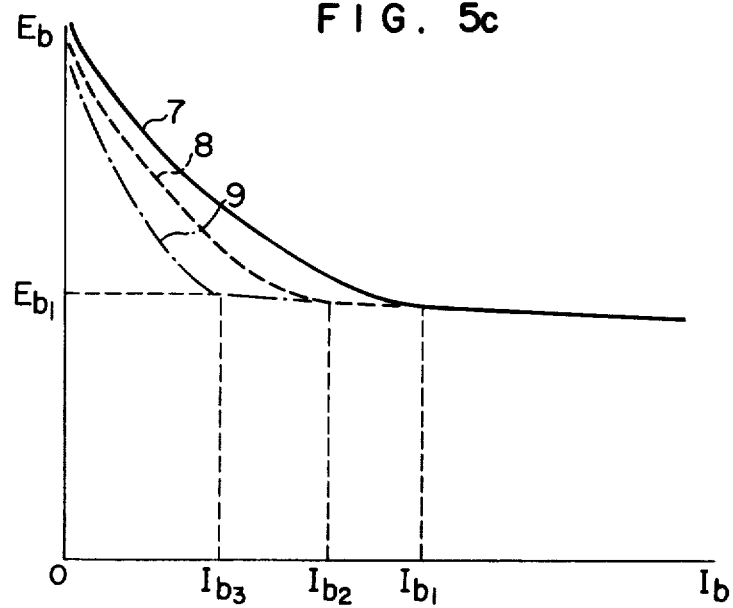

It will be apparent from the foregoing description that if the same high voltage regulation characteristics are to be obtained for all methods of tuning, a high voltage load of $Eb_1 \times Ib_1$ for the 5th order harmonic tuning, $Eb_1 \times Ib_2$ for the 7th order harmonic tuning and $Eb_1 \times Ib_3$ for the 9th or higher order harmonic tuning must be taken out of the high voltage circuit as shown in FIG. 5c. Since $Ib_1 > Ib_2 > Ib_3$, the 7th or 9th order harmonic tuning, which requires a less high voltage load to be taken out of the high voltage circuit, makes possible a higher efficiency of the high-voltage circuit thereby to effectively reduce power consumption and improve the reliability. For example, the same high voltage regulation characteristics are obtained for the 5th and 9th order harmonic tunings with a loss of the high voltage resistor of FIG. 6 for the latter about half as little as that for the former.

Figure 7A:
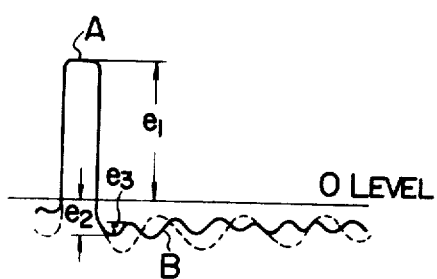
FIGS. 7a and 7b show waveforms of the secondary voltage of the fly-back transformer used in the circuit of FIG. 6.

Further, in the event that a higher harmonic tuning of the 7th or 9th and above order is involved, the waveform of the ringing B on the secondary side of the fly-back transformer is as shown by the solid line in FIG. 7a in the absence of a load taken out of the high voltage circuit. As is seen, the amplitude $e_3$ of the ringing pulse B is smaller for the present case than for the case of the 5th order higher harmonic tuning indicated by the dashed line, naturally resulting in a smaller ratio of the ringing pulse amplitude $e_3$ to the fly-back pulse amplitude $e_1$. What waveform the fly-back pulse A takes is different according to the number of the order of higher harmonic tuning and is not shown in detail by the drawing. As an example, if current is made to flow constantly in the high voltage resistor 5 inserted between the output circuit and the earth of FIG. 6 and a load is always taken out of the fly-back transformer for the 7th or 9th and higher order harmonic tuning, it is possible to reduce to substantially zero the amplitude $e_3$ of the ringing pulse in the input waveform of the voltage-multiplying rectifier circuit as shwon in FIG. 7b even in the absence of current flowing in the color picture tube 1. As a result, the variations of the ratio $e_2/e_1$ is minimized against any variations in the loads $Zm$ and $Zn$ of the high voltage power supply shown in FIG. 3. In this case also, the loss of the high voltage resistor 5 is less for the higher harmonic tuning of the 7th or 9th and higher orders than for the one of the 5th order, thus greatly contributing to an improved efficiency of the high voltage circuit. Furthermore, in the voltage-multiplying rectifier system involving $n$ stages, the ratio of the voltage-multiplying rectification output $Eb$ to the middle high voltage $Em$ of the $m$-th order multiplicaton may be expressed as follows by modification of equation (3) above:

$$Eb/Em = \frac{n}{m} + \frac{(\frac{n}{m} - 1)e_2}{me_1 + (m - 1)e_2} \quad (4)$$

In this equation, the value $n/m$ required for obtaining a desired ratio $Eb/Em$ is constant. The larger the values of $n$ and $m$, the larger the denominator of the corrective term, that is, the second term on the right side in equation (4), resulting in a smaller variation in the crorective term with respect to variations of $e_2$. In other words, when $e_2$ changes due to a change in the load, $Eb/Em$ changes less the larger the values of $m$ and $n$. As will be seen from the above description, by increasing the number of stages of voltage-multiplying rectification as required and by taking out a smaller load from the fly-back transformer than in the case of the 5th order higher harmonic tuning as shown in the embodiment using the high-valued resistor 5 in the high-voltage output circuit of FIG. 6, it is possible in the 7th or 9th and higher order harmonic tuning to maintain $Eb/Em$ constant against variations in high voltage loads $Zn$ and $Zm$.

In this way, a higher harmonic tuning system has the great advantage that a highly efficient high voltage circuit can be realized. In actual practice, a higher harmonic tuning system of as high order as possible should be employed according to the operating and design conditions as the leakage inductance and distributed capacitance on the secondary side of the fly-back transformer depend on the construction of the fly-back transformer and the voltage-multiplying rectifier circuit.

It is thus possible to select a suitable value of the ratio of high voltage $Eb$ to the middle high voltage $Em$ (= $Ef$) and also to maintain a fixed $Eb/Em$ under variations in the loads $Zn$ and $Zm$ of the high voltage power supply, resulting in a color television receiver being obtained which is very stable in color purity.

Figure 8A:
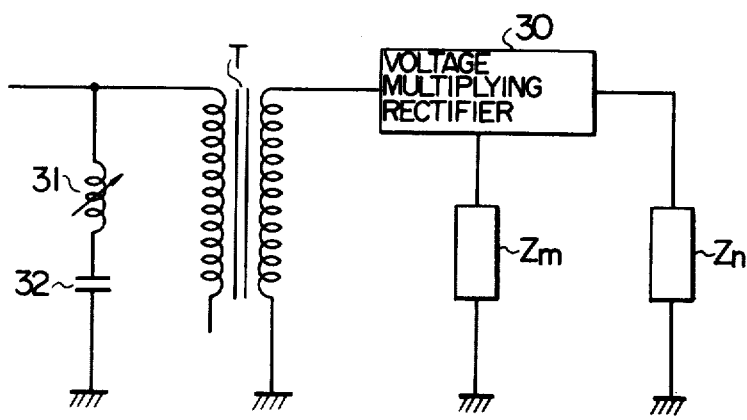
FIGS. 8a and 8b are block diagrams showing still other embodiments of the invention.
Figure 8B:
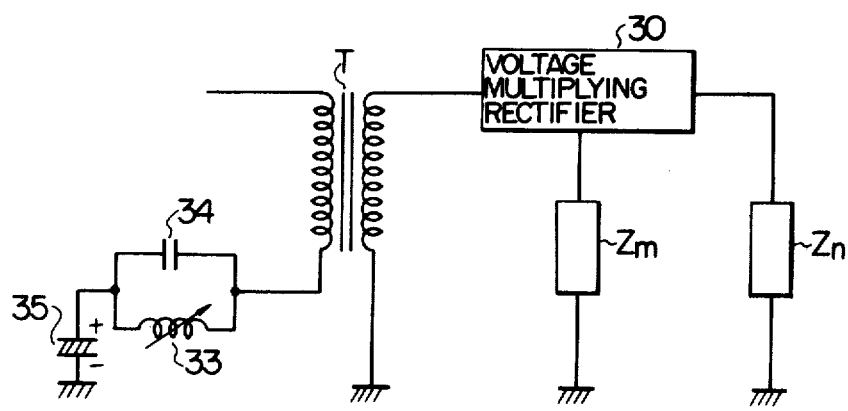

Several modifications of the above-described embodiment will be described below. First modification:

A couple of examples of the first modification are shown in FIG. 8a and FIG. 8b. The fly-back transformer T for higher harmonic tuning of the 7th or higher order associated with the leakage inductance and distributed capacitance of the fly-back transformer T has its primary side connected to a resonance circuit adapted to be tuned to a higher harmonic of an order (including the 3rd to 6th orders) different from that for the fly-back transformer T.

In the drawings, reference symbol T shows, as already described, the fly-back transformer, Zn a load circuit such as a color picture tube, and Zm a load such as a shadow mask connected to an intermediate stage terminal of the voltage-multiplying rectifier circuit 30 which may be, for example, a voltage doubler. Reference numerals 31 and 32 show respectively an inductance and a capacitor of a series resonance circuit having a resonance frequency of a higher harmonic order different from that for the fly-back transformer T. Numerals 33 and 34 show an inductance and a capacitor respectively of a parallel resonance circuit which are similar to the inductance 31 and capacitor 32 respectively. Numeral 35 shows a DC-blocking capacitor. Substantially the same advantage is obtained by connecting the resonance circuit in series with the primary of the fly-back transformer T as when it is connected in series with the secondary winding or both.

The operation and advantages of the modification under consideration will be explained below.

Figure 9A:
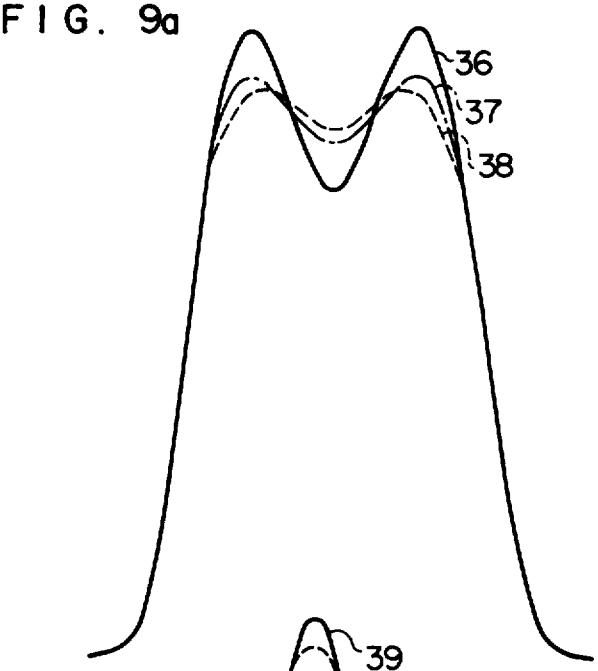
FIGS. 9a and 9c show secondary voltage waveforms of the fly-back transformers shown in the circuits of FIGS. 8a and 8b.
Figure 9B:
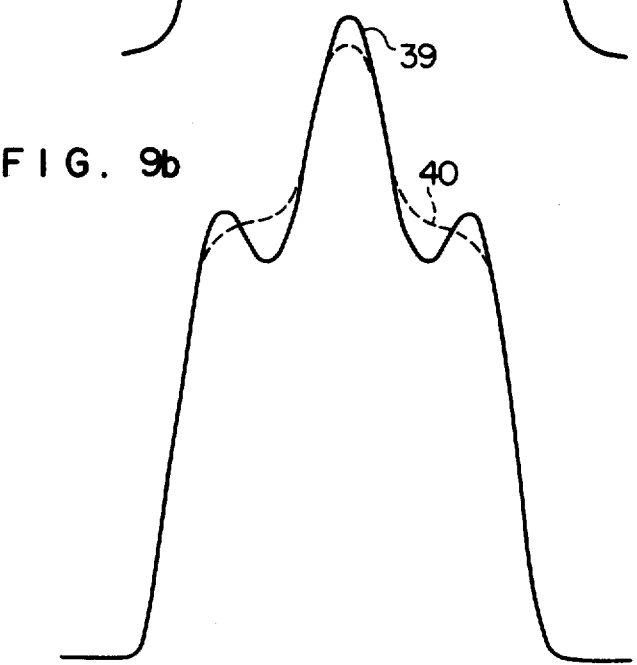
Figure 9C:
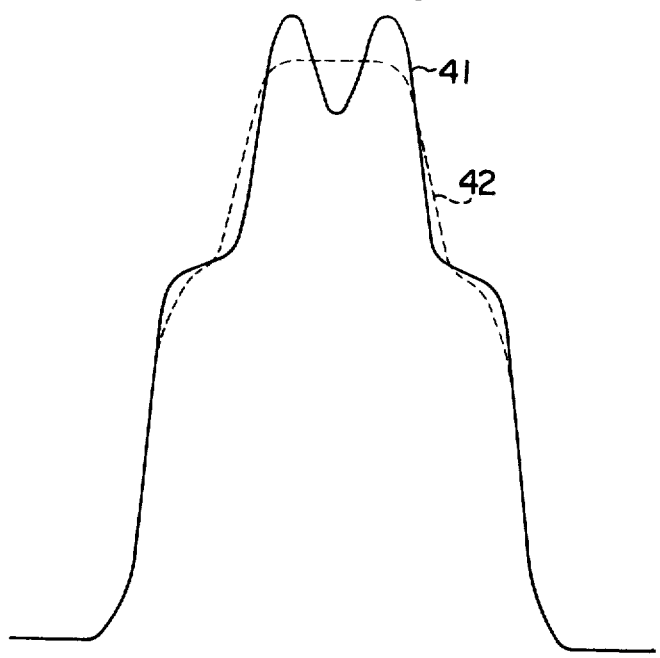

The diagrams of FIGS. 9a, 9b and 9c show voltage waveforms of fly-back pulses produced on the secondary side of the fly-back transformer T as it is adapted for higher harmonic tuning of the 5th, 7th and 9th order respectively. Curves 36, 39 and 41 denote the cases in which the resonance circuit is not connected to the transformer. In FIG. 9a, numeral 37 shows a voltage waveform produced when a 7th-order higher harmonic resonance circuit is connected externally, and numeral 38 the one produced when a 7th-order higher harmonic resonance circuit and a 9th-order higher harmonic resonance circuit are connected to the primary and secondary sides of the transformer respectively.

Referring to FIG. 9b, reference numeral 40 shows a case in which a 9th-order higher harmonic resonance circuit is connected. Reference numeral 42 in FIG. 9c shows a waveform produced when an 11th-order higher harmonic resonance circuit is connected.

It will be noted from the drawings that external connection of a resonance circuit enables the waveform produced on the secondary side of the fly-back transformer T to be flattened, thereby making it possible to improve the high voltage regulation characteristics.

Furthermore, deviation and dispersion in the higher harmonic tuning of the fly-back transformer itself can be corrected by adjusting the inductances 31 and 33 and changing the resonance point of the resonance circuit.

It will be understood from the foregoing description that external provision of the resonance circuit makes possible an improved high voltage regulation characteristics on the one hand and eliminates dispersion of such characteristics. Thus a post focusing type color picture tube can be obtained with a stable high voltage. Second modification:

As shown in FIG. 6, a DC power supply EC is inserted between the low voltage terminal of the secondary side of the fly-back transformer T and earth. When a source voltage E is applied under this condition, the equations (1) to (3) are rewritten as follows:

$$Eb = ne_1 + (n - 1)e_2 + E \quad (5)$$

$$Em = me_1 + (m - 1)e_2 + E \quad (6)$$

$$Eb/Em = \frac{ne_1 + (n - 1)e_2 + E}{me_1 + (m - 1)e_2 + E} \quad (7)$$

As a result, it is possible to change the values Eb and Em by changing the voltage E, thereby enabling fine adjustment of the ratio Eb/Em.

Also, if a resistor in series with the power supply EC is connected to the low voltage terminal on the secondary side of the fly-back transformer T, the DC voltage E across the secondary winding can be changed according to the current flowing in the fly-back transformer. This fact may be utilized when it is desired to effect fine control of Eb/Em due to a brightness change on the color picture tube.

By the way, the power supply EC may be alternatively an equivalent power supply which is capable of functioning as a DC power supply.

Figure 10:
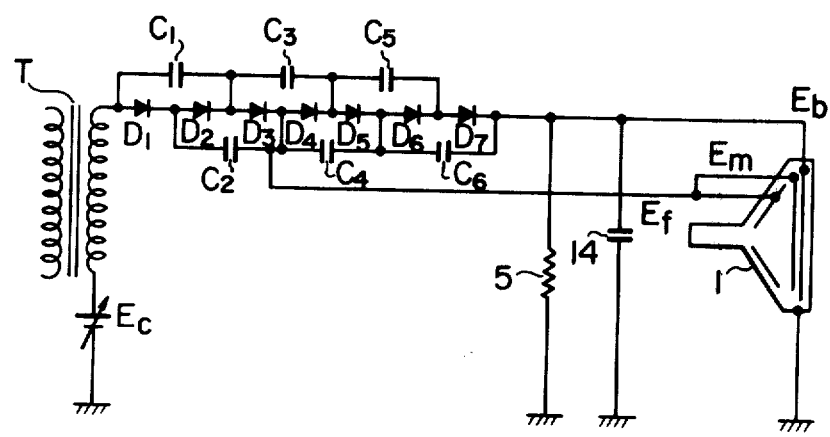
FIG. 10 is a diagram showing an actual circuit according to an embodiment of the invention.

An actual example of the high voltage circuit according to the second modification is shown in FIG. 10. This circuit employs a voltage-quadrupling rectifier system and is the case in which the fly-back transformer T is adapted for the 7th or 9th and higher harmonic tuning. In this circuit, $n = 4$ and $m = 2$ in equation (7) above. The ratio between the high voltage Eb and the middle high voltage Em obtained from the equation (4) is $$\frac{\text{high voltage } Eb}{\text{middle high voltage } Em} = 2 + \frac{e_2 - E}{2e_1 + e_2 + E} \quad (8)$$

Figure 7B:
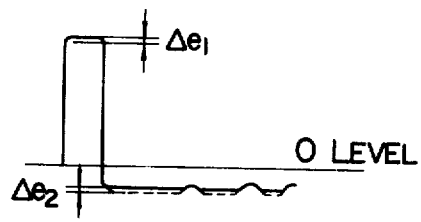

As already mentioned with reference to FIG. 6, FIG. 5c, FIG. 7b and equation (4), variations in $e_1$ and $e_2$ can be minimized, and therefore it is possible to realize a high voltage circuit which has a fixed ratio between the high voltage Eb and the middle high voltage Em and is higher in efficiency than the 5th-order higher harmonic tuning system. Also, fine adjustment of Eb and Em can be effected by chaning the DC voltage E applied, as shown with reference to equation (8).

Thus, the ratio between the high voltage Eb and the middle high voltage Em (= Ef) can be selected as desired on the one hand and is maintained constant even when the loads Zn and Zm at the final and m-th stages of the high voltage power supply undergo a change. Third modification:

In the color picture tube of post focusing type, even though a receiver with a very stable color purity is obtained by maintaining constant the ratio between Eb and Em (= Ef) as mentioned above, halation is liable to occur due to secondary electrons produced when beam current impinges on the shadow mask. In order to overcome this problem, a voltage higher than the shadow mask voltge Em is applied as the funnel section anode voltage Ef of the color picture tube of post focusing type shown in FIG. 1, so that the secondary electrons are absorbed by the funnel section anode.

Figure 11:
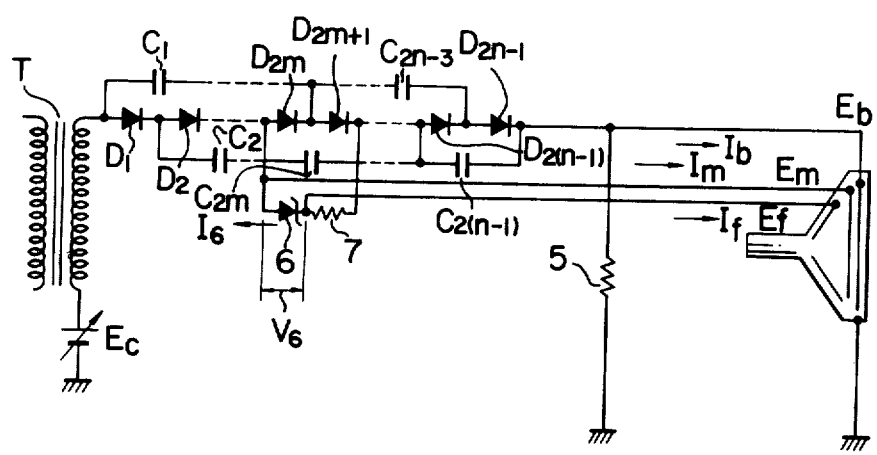
FIG. 11 is a diagram showing an actual circuit according to another embodiment of the invention.

As a power supply for voltage Ef, a resistor 7 and a voltage stabilizing element 6 having a constant-voltage characteristic similar to that of the high-voltage stabilizating element ZD are inserted in series between a middle high voltage point at the m-th stage of the high voltage circuit and another middle voltage point at the (m + 1)th stage thereof as shown in FIG. 11. By taking out a voltage $V_6$ from the junction point of the voltage stabilizing element 6 and the resistor 7, it is possible to obtain the funnel section anode voltage $Ef$ which is higher than $Em$ by $V_6$.

The shown positions at which the resistor 7 and the voltage-stabilizing element 6 are inserted in the circuit of FIG. 11 are illustrative and they may alternatively be connected between other middle high voltage points at the $m$-th and $(m + 1)$th stages.

As to the requirement for maintaining constant the ratio between $Eb$ and $Ef$ to achieve a stable color purity, it can be fulfilled by controlling the tolerable error of the voltage stabilizing element 6 to a certain degree in view of the fact that the difference between $Ef$ and $Em$ may be very small as compared with the absolute value of $Ef$ or $Em$ and also that the ratio between $Eb$ and $Em$ is constant as mentioned already.

Figure 12A:
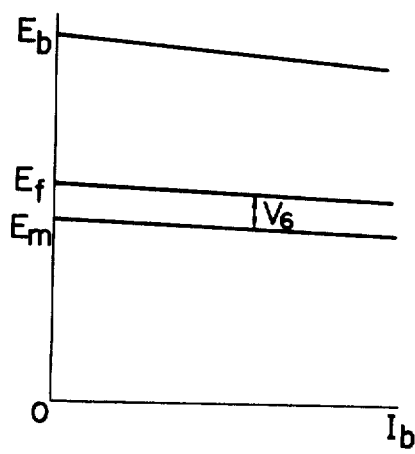
FIGS. 12a and 12b are characteristics diagrams for voltage-stabilizing elements used in the circuit of FIG. 11.

Further, when the load $Zn$ or $Zm$ of the high voltage power supply changes as a result of, say, an enhanced brightness due to an increased current $Ib$ in the phosphor screen, the high voltages $Eb$, $Ef$ and $Em$ drop as will be seen from FIG. 12a, while the load current $If$ and $Im$ are increased thereby to reduce the current $Is$ flowing in the voltage-stabilizing element 6.

Figure 12B:
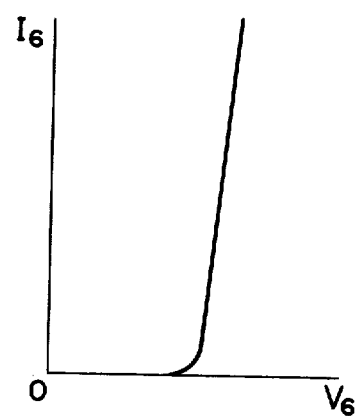

The characteristics of the voltage-stabilizing element 6 are such that, as shown in FIG. 12b, the stabilization voltage $V_6$ drops slightly when the current $I_6$ therethrough is reduced. Therefore, in the event that the high voltage load is increased to reduce $Eb$ and $Em$, the voltage $V_6$ changes in such a way as to prevent any change in $Eb/Ef$, thereby maintaining the ratio $Eb/Ef$ substantially constant.

Also, there might be a case in which the voltage-stabilizing element 6 is cut off by an instantaneous peak current when the current flowing in the color picture tube changes instantaneously due to a change in a video signal or the like. This excessive response characteristic may be corrected by supplying peak current from a capacitor which is newly connected between the point for taking out the funnel section anode voltage $Ef$ and a section of a lower DC voltage.

In this way, a color picture tube of post focusing type is realized in which the ratio between $Eb$ and $Em$ or between $Eb$ and $Ef$ can be appropriately selected and is constant against any change in the high voltage power supply load, as well as having a very stable color purity but no halation. Fourth modification:

If a voltage higher than the middle high voltage of the voltage-multiplying rectifier circuit can be obtained, such a voltage may be used as the shadow mask voltage $Em$ or the funnel section anode voltage $Ef$ of the post focusing type color picture tube.

Figure 13A:
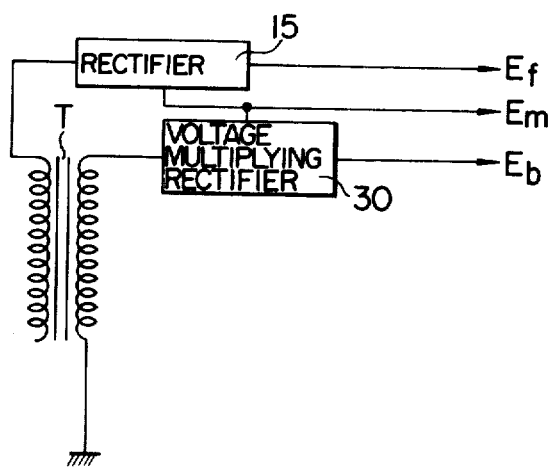
FIG. 13a is a block diagram showing a further embodiment of the invention.

A method of obtaining such a high voltage consists in applying a pulse on the primary side of the fly-back transformer or a pulse obtained by splitting the same to the DC voltage point of the voltage-multiplying rectifier circuit 30 through the rectifier circuit 15 as shown in FIG. 13a, with the result that a voltage $Ef$ higher than $Em$ by a predetermined value is produced as an output of the rectifier circuit 15.

The pulse on the primary side of the fly-back transformer may be conveniently used as a pulse to be applied to the rectifier circuit 15, but it may be replaced by other pulse voltage.

Figure 13B:
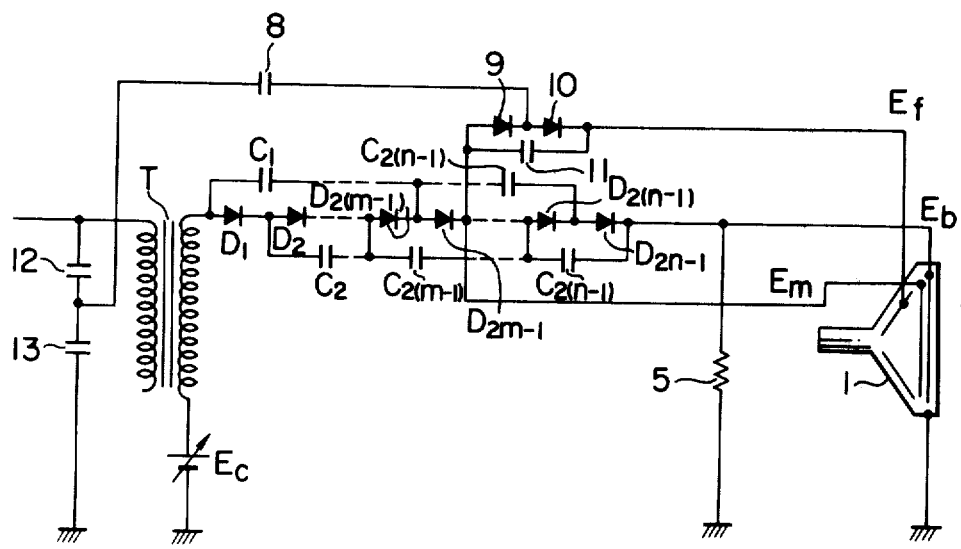

In a specific method to obtain such a voltage as shown in FIG. 13b, rectifying diodes 9 and 10 are inserted in series with the output circuit of the middle high circuit $Em$, while a capacitor 11 is connected between the anode of the diode 9 on the side nearer to the power supply and the cathode of the diode 10 on the side nearer to the load. Further, the junction point of the diodes 9 and 10 is connected to one of the terminals of the capacitor 8, while the input voltage on the primary side of the fly-back transformer is split by capacitors 12 and 3 and applied to the other terminal of the capacitor 8. For the purpose of splitting the input voltage as above, the splitting capacitors may be replaced by an inductance or resistor. Also, the input voltage on the primary side of the fly-back transformer may be applied directly to the other terminal of the capacitor 8 without splitting it. It is thus possible to obtain as an output of the diode 10 a voltage $Ef$ which is the result of adding a rectified input voltage on the primary side of the fly-back transformer to the middle high voltage $Em$. The voltage $Ef$ may be even more stable by connecting a resistor across the capacitor 11. This capacitor may be replaced by a capacitor connected equivalently on the side of the load of $Ef$.

The output voltage of the diode 10 can be changed as desired by changing the splitting ratio of the input voltage of the primary side, thus making it possible to change only the voltage to be added to the middle high voltage, without changing the output voltage $Eb$ of the voltage-multiplying rectifier circuit. Accordingly, if the voltage resulting from the addition is used as the funnel section anode voltage $Ef$, the equation (7) is given in the form as follows:

$$\frac{Eb \ (n\text{-times higher voltage})}{Ef \ (m\text{th-stage high voltage + added voltage})} = \frac{ne_1(n-1)e_2 + E}{me_1 + (m-1)e_2 + E + V} \quad (9)$$

where $V$ is a rectified voltage of the pulse on the primary side to be applied to the capacitor 8.

As will be noted from the equation (9), it is possible to change the ratio $Eb/Ef$ more efficiently by changing the rectified voltage $V$ of the input pulse on the primary side than by changing the applied voltage $E$.

In this way, a high voltage circuit is realized in which the ratios $Eb/Em$ and $Eb/Ef$ are very stable against any variations in the load of the high voltage power supply.

By the way, when the load of $Ef$ changes, there also occurs a change in the current flowing from the primary side of the fly-back transformer into the capacitor 8. This fact is utilized to control the voltage $Ef$ by changing the voltage $V$ against changes in the brightness of the color picture tube in an arrangement in which the primary side of the fly-back transformer is connected through a resistor to the capacitor 8. This method which offers a possibility to control the voltage $Ef$ from the primary side of the fly-back transformer provides a very advantageous means when it is desired to control $Ef$ against changes in brightness.

Figure 14:
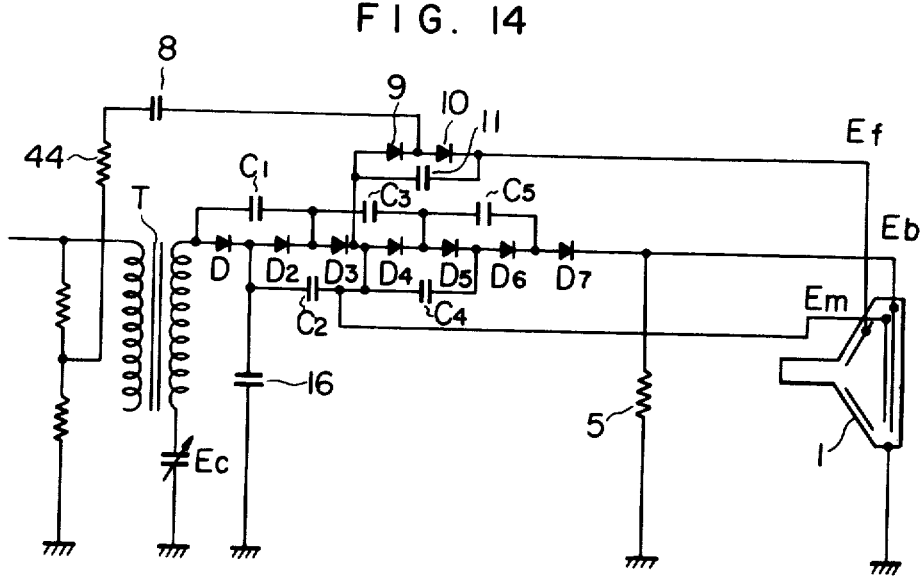
Figure 15:
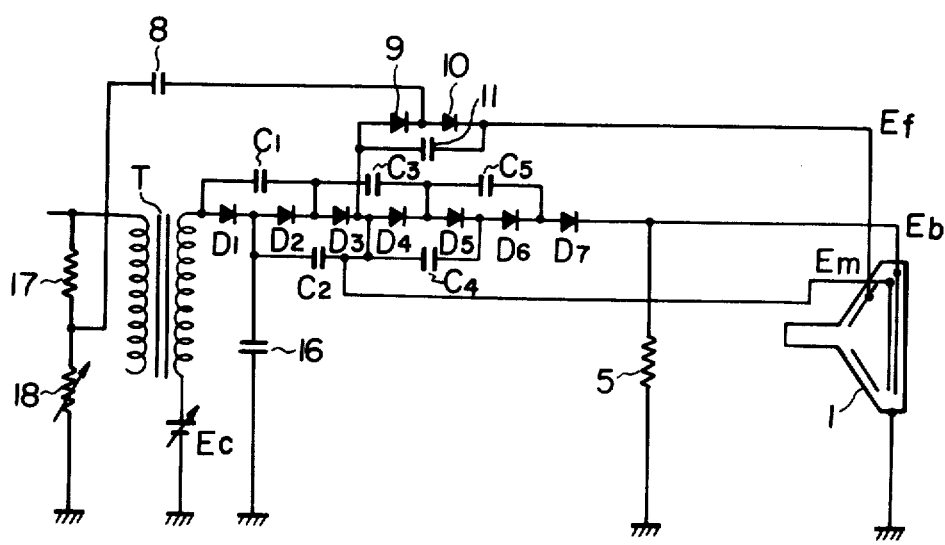

Referring to FIGS. 14 and 15 showing actual examples of the high voltage circuit according to the fourth modification of the invention, the shown circuits employ the rectifying diodes 9 and 10, the smoothing capacitor 11 and the coupling capacitor 8 and operates in such a manner that the pulse input on the primary side of the fly-back transformer is rectified after being appropriately divided and is applied to the middle high voltage point at the double voltage stage thereby to obtain the voltage $Ef$ more stable than $Em$, FIGS. 14 and 15 showing circuits involving inductance splitting and resistance splitting respectively. As already explained with reference to equation (9), these circuits are such that the ratio of $Eb$ to $Ef$ can be changed by changing the rectified pulse voltage V as the result of changing the ratio at which the input pulse on the primary side of the fly-back transformer is split. In this case, the ratio of $Eb$ to $Ef$ can be expressed by the equation below in which $n$ and $m$ in the equation (9) is substituted by 4 and 2 respectively.

$$Eb/Ef = 2 + \frac{e_2 - (E + 2V)}{2e_1 + e_2 + E + V} \tag{10}$$

Incidentally, the resistor 44 in FIG. 14 is provided for the purpose of correcting the high voltage ratio even in better way by slightly changing the voltage V in the case of a small change in the ratio $Eb/Ef$ against a change in the brightness of the color picture tube. In this manner, the present invention provides a color television receiver of post focusing type which has a very stable color purity but no halation. Fifth modification:

In this modification, as the pulse voltage applied to the capacitor 8 in the fourth modification, a pulse induced by mutual inductance in a tertiary winding added to the fly-back transformer is used to obtain an addition voltage similar to that in the preceding modification.

In this case, the magnitude of the pulse can be controlled by changing the position of the tertiary winding and thus changing the coupling factor, thereby making it possible to change the ratio of $Eb$ to $Ef$.

Furthermore, as an input to be applied to the terminal of the capacitor 8 on the other side thereof as viewed from the diodes 9 and 10, one of the inductances used for splitting the input on the primary side of the fly-back transformer is provided with an iron core and a secondary winding, so that the iron core is saturated by changing the DC current flowing in the secondary winding thereby to change the split ratio.

In this way, the pulse rectified voltage V on the primary side of the fly-back transformer as expressed by equation (9) can be changed continuously, thus offering a great convenience for adjustment of a required voltage ratio.

Figure 16:
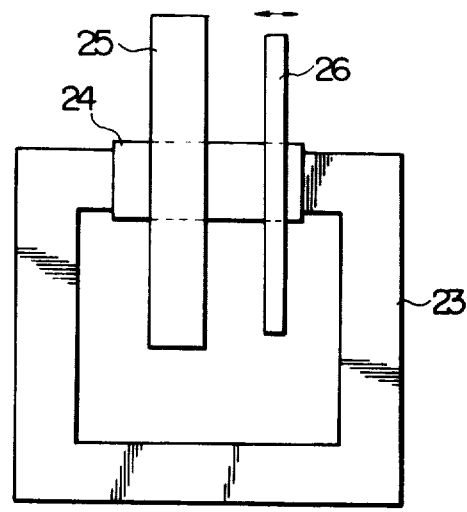
FIG. 16 is a diagram schematically showing a side view of an actual example of the fly-back transformer used in the invention.

The diagram of FIG. 16 shows the construction of an example of the winding section of the fly-back transformer of the high-voltage circuit used in the modification under consideration. Reference numeral 23 shows a core on which the primary winding 24 is provided, and on this primary winding 24 is mounted the secondary winding 25. Further, the tertiary winding 26 is placed on the primary winding 24. Pulses generated in the tertiary winding 26 of the fly-back transformer by mutual inductance are used as an input to the coupling capacitor 8 shown in FIGS. 13 to 15 thereby to maintain the ratio of $Eb$ to $Ef$ constant as shown in equation (10).

Also, $Eb/Ef$ can be adjusted by changing the position of the tertiary winding 26 shown in FIG. 16 and thus by changing the rectified voltage of the induced pulses.

Figure 17:
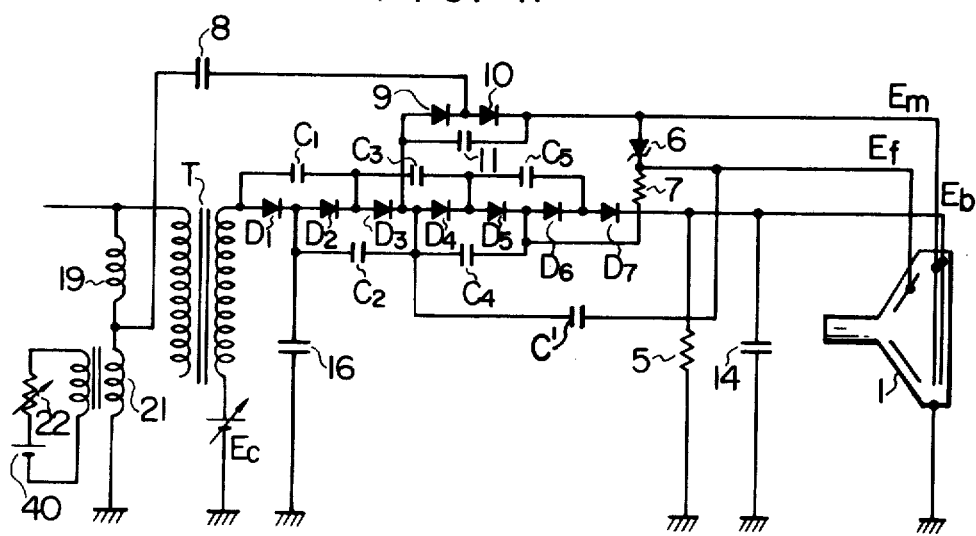
FIG. 17 is a diagram showing a further embodiment of the invention.

Referring to FIG. 17 showing a circuit diagram of another example of the fifth modification, a variable DC current is adapted to flow in the secondary winding of the inductance 21 used for splitting the input pulses on the primary side of the fly-back transformer. The variable current in the secondary winding is supplied by a power supply 40 connected in series therewith through a variable resistor 22. This DC current is used to saturate the iron core and thereby to change the value of the inductance 21, thus changing the split ratio, so that the rectified pulse voltage V on the primary side of the fly-back transformer can be continuously changed, thereby greatly facilitating the required adjustment of the voltage ratio. A capacitor C' may be connected between the junction of elements 6 and 7 and the $m$-th or lower middle stage, such as the junction of capacitors C2 and C4 in FIG. 17.

As explained in detail above, according to the present invention, it is possible to realize a color picture tube of post focusing type having a highly efficient high voltage circuit which is characterized by both stable color purity and elimination of halation with a great advantage.

We claim:

1. A high voltage circuit for generating a plurality of high voltages of different values for a color picture tube of post focusing type, comprising:
   a fly-back transformer including a first resonance circuit having such a parasitic constant as to be tuned to a higher harmonic with a frequency which is an odd number times as high as the fundamental frequency of fly-back pulses, said odd number being not less than 7;
   a voltage-multiplying rectifier circuit with multiple stages connected to a secondary winding of said fly-back transformer and having an output terminal at the final stage thereof and another output terminal at an intermediate stage thereof, said voltage-multiplying rectifier circuit further including a plurality of rectifier elements and a plurality of capacitor elements;
   a voltage stabilizing element and a resistor both connected in series between an output terminal of the $m$-th stage and another output terminal of a higher middle stage of said multiple-stage voltage-multiplying rectifier circuit; and
   means for collecting a third high voltage from the junction point of said voltage stabilizing element and said resistor.

2. A high voltage circuit according to claim 1, further comprising a capacitor element inserted between said junction point and the $m$-th or lower middle stage of said multiple-stage voltage-multiplying rectifier circuit.

3. A high voltage circuit for generating a plurality of high voltages of different values for a color picture tube of post focusing type, comprising:
   a fly-back transformer including a first resonance circuit having such a parasitic constant as to be tuned to a higher harmonic with a frequency which is an odd number times as high as the fundamental frequency of fly-back pulses, said odd number being not less than seven;
   a voltage-multiplying rectifier circuit with multiple stages connected to a secondary winding of said fly-back transformer and having an output terminal at the final stage thereof and another output terminal at an intermediate stage thereof, said voltage-multiplying rectifier circuit further including a plurality of rectifier elements and a plurality of capacitor elements;
   means for producing fly-back pulses from said fly-back transformer;
   a rectifier circuit for rectifying said fly-back pulses obtained by said means; and means for adding the output voltage of said rectifier circuit to a high voltage obtained from an output terminal of an intermediate stage of said multiple-stage voltage-multiplying rectifier circuit and producing an output which is the result of said adding operation.

4. A high voltage circuit according to claim 3, in which said means for obtaining said fly-back pulses comprises a tertiary winding provided in said fly-back transformer.

5. In a high voltage circuit for generating a plurality of high voltages of different values for the color picture tube of post focusing type, comprising:

A fly-back transformer including a primary winding to which horizontal output pulses are supplied and a secondary winding for producing thereacross high voltage fly-back pulses;

multiple stage multiplying voltage rectifier means connected to a terminal of the secondary winding of said fly-back transformer and made up of voltage rectifier circuits formed into $n$ stages for producing high DC voltages;

means for obtaining a first DC voltage from the $n$-th stage of said voltage rectifier means, where $n$ is an integer and is greater than 1;

means for outputting a second DC voltage obtained from the $m$-th stage of said voltage rectifier means, where $m$ is an integer and $(1<m<n)$; and a first voltage stabilizing element connected between an output terminal of an $l$-th stage of said voltage rectifier means and a reference potential, where $l$ is an integer and $(1<l\leq n)$, the improvement comprising a first resonance circuit made up of leakage inductance and distributed capacitance of said fly-back transformer and having such a parasitic constant as to be tuned to a higher harmonic with a frequency which is an odd number times as high as the fundamental frequency of the fly-back pulses, said odd number being not less than seven.

6. A high voltage circuit according to claim 5, wherein said first voltage stabilizing element is a Zener diode.

7. A high voltage circuit according to claim 5, wherein said first voltage stabilizing element is a resistor having a high resistance.

8. A high voltage circuit according to claim 5, further comprising a power supply means connected between a point of a reference potential and another terminal of the secondary winding of said fly-back transformer, said power supply means generating a DC voltage.

9. A high voltage circuit according to claim 5, wherein said odd number is not less than nine.

10. In a high voltage circuit for generating a plurality of high voltages of different values for the color picture tube of post focusing type, comprising:

a fly-back transformer including a primary winding to which horizontal output pulses are supplied and a secondary winding for producing thereacross high voltage fly-back pulses;

multiple stage multiplying voltage rectifier means connected to a terminal of the secondary winding of said fly-back transformer and made up of voltage rectifier circuits formed into $n$ stages for producing high DC voltages;

means for obtaining a first DC voltage from the $n$-th stage of said voltage rectifier means, where $n$ is an integer and is greater than 1;

means for outputting a second DC voltage obtained from the $m$-th stage of said voltage rectifier means, where $m$ is an integer and $(1<m<n)$;

a first voltage stabilizing element connected between an output terminal of an $l$-th stage of said voltage rectifier means and a reference potential, where $l$ is an integer and $(1<l\leq n)$, the improvement comprising a first resonance circuit made up of leakage inductance and distributed capacitance of said fly-back transformer and having such a parasitic constant as to be tuned to a higher harmonic with a frequency which is an odd number times as high as the fundamental frequency of the fly-back pulses, said odd number being not less than seven; and a second resonance circuit connected to at least one of the primary winding and the secondary winding of said fly-back transformer and adapted to be tuned to a higher harmonic of a frequency which is an integral multiple of the fundamental frequency of the fly-back pulse signal, said integral multiple frequency being different from the higher harmonic frequency tuned in said first resonance circuit.

11. A high voltage circuit for generating a plurality of high voltages of different values for a color picture tube of post foucsing type, comprising:

a fly-back transformer including a first resonance circuit having such a parasitic constant as to be turned to a higher harmonic with a frequency which is an odd number times as high as the fundamental frequency of fly-back pulses, said odd number being not less than nine multiple stage multiplying voltage rectifier means made up of voltage rectifier circuits formed into $n$ stages for producing high DC voltages from the output of said fly-back transformer and connected to one terminal of the secondary winding of said fly-back transformer;

means for obtaining a first DC voltage from the $n$-th stage of said voltage rectifier means, where $n$ is an integer and is greater than 1;

means for outputting a second DC voltage obtained from the $m$-th stage of said voltage rectifier means, where $m$ is an integer and where $(1<m<n)$;

a first voltage stabilizing element connected between an output terminal of an $l$-th stage of said voltage rectifier means and a reference potential, where $l$ is an integer and where $(1<l\leq n)$;

a second voltage stabilizing element and a resistor both connected in series between an output terminal of the $k$-th stage and another output terminal of said multiple stage voltage rectifier means, where $k$ is an integer and where $(l<k<n)$, the voltage of said another terminal being higher than that of $k$-th stage; and means for obtaining a third high voltage from the junction point of said second voltage stabilizing element and said resistor.

12. A high voltage circuit according to claim 11, further comprising a capacitor element inserted between said junction point of said second voltage stabilizing element and said resistor and the $k$-th or the other stage of said multiple stage voltage rectifier means, the voltage of the other stage being lower than that of the $k$-th stage.

13. A high voltage circuit according to claim 11, wherein said second voltage stabilizing element is a Zener diode.

14. A high voltage circuit for generating a plurality of high voltages of different values for a color picture tube of post focusing type, comprising:
- a fly-back transformer including a first resonance circuit having such a parasitic constant as to be turned to a higher harmonic with a frequency which is an odd number times as high as the fundamental frequency of fly-back pulses, said odd number being not less than nine;
- multiple stage multiplying voltage rectifier means made up of voltage rectifier circuits formed into $n$ stages for producing high DC voltages from the output of said fly-back transformer and connected to one terminal of the secondary winding of said fly-back transformer;
- means for outputting a first DC voltage obtained from the $n$-th stage of said voltage rectifier means, where $n$ is an integer and is greater than 1;
- means for obtaining a second DC voltage from the $m$-th stage of said voltage rectifier means, where $m$ is an integer and where $(1<m<n)$;
- a first voltage stabilizing element connected between an output terminal of an $l$-th stage of said voltage rectifier means and a reference potential where $l$ is an integer and where $(1<l\leq n)$;
- means for obtaining fly-back pulses from said fly-back transformer;
- a rectifier circuit for rectifying said fly-back pulses obtained by said obtaining means; and
- means for adding the output voltage of said rectifier circuit a high voltage obtained from an output terminal of an intermediate stage of said multiple stage voltage rectifier means and producing an output which is the result of said adding operation.

15. A high voltage circuit according to claim 14, wherein said means for obtaining said fly-back pulses comprises first and second capacitance elements connected in series between one end of the primary winding of said fly-back transformer and reference potential, and means for applying fly-back pulses divided by said first and second capacitance elements to said rectifier circuit.

16. A high voltage circuit according to claim 14, wherein said means for obtaining said fly-back pulses comprises first and second resistors connected in series between one end of the primary winding of said fly-back transformer and reference potential, and means for applying fly-back pulses divided by said first and second resistors to said rectifier circuit.

17. A high voltage circuit according to claim 14, in which said means for obtaining said fly-back pulses comprises a teritiary winding provided in said fly-back transformer.

18. A high voltage circuit according to claim 14, wherein said means for obtaining said fly-back pulses comprises first and second inductance elements connected in series between one end of the primary winding of said fly-back transformer and reference potential, means for applying fly-back pulses divided by said first and second inductance elements to said rectifier circuit, a winding wound on a core of one of said inductance elements, and means to supply a variable current to the last-mentioned winding, whereby a voltage provided from a point of connection of said first and second inductance elements can be changed by varying the current of said winding.

19. A high voltage circuit according to claim 14, wherein said rectifier circuit including first and second rectifiers connected in series between an intermediate stage of said multiple stage voltage rectifier means and an output terminal, and a capacitance element connected between said fly-back pulses obtaining means and the point of connection of said first and second rectifiers.

20. A high voltage circuit for generating a plurality of high voltages of different values for a color picture tube of post focusing type, comprising:
- a fly-back transformer including a first resonance circuit made up of leakage inductance and distributed capacitance of said fly-back transformer and having such a parasitic constant as to be tuned to a higher harmonic with a frequency which is an odd number times as high as the fundamental frequency of a fly-back pulse signal, said odd number being not less than nine;
- a voltage-multiplying rectifier circuit with multiple stages connected to a secondary winding of said fly-back transformer and having a first output terminal at the final stage thereof and second and third output terminals at intermediate stages thereof, said voltage-multiplying rectifier circuit further including a plurality of rectifier elements and a plurality of capacitor elements;
- means for deriving the plurality of high voltages of different values for the color picture tube from said first and second output terminals;
- a voltage stabilizing element connected between said third output terminal and a reference potential; and
- a second resonance circuit connected to at least one of the primary winding and the secondary winding of said fly-back transformer and adapted to be turned to a higher harmonic of a frequency which is an integral multiple of the fundamental frequency of the fly-back pulses, said integral multiple being different from the one to which said first resonance circuit is tuned.

21. A high voltage circuit for generating a plurality of high voltages of different values for a color picture tube of post focusing type, comprising:
- a fly-back transformer including a resonance circuit having such a parasitic constant as to be tuned to a higher harmonic with a frequency which is an odd number times as high as the fundamental frequency of fly-back pulses, said odd number being not less than seven for providing improved high voltage circuit operation with respect to lower order odd number harmonic tuning;
- a voltage-multiplying rectifier circuit with multiple stages connected to a secondary winding of said fly-back transformer and having at least first and second output terminals at different respective stages of said voltage-multiplying rectifier circuit; and
- means for deriving the plurality of high voltages of different values for the color picture tube from the at least first and second output terminals.

22. A high voltage circuit according to claim 21, wherein said resonance circuit is made up of leakage inductance and distributed capacitance of said fly-back transformer.

23. A high voltage circuit according to claim 22, wherein said odd number harmonic tuning provides 24. A high voltage circuit according to claim 23, wherein said voltage-multiplying rectifier circuit is provided with a third output terminal at an intermediate stage thereof, voltage stabilizing means being connected between said third output terminal and a reference potential.

25. A high voltage circuit for generating a plurality of high voltages of different values for a color picture tube of post focusing type, comprising:

a fly-back transformer having a primary winding and a secondary winding;

means for tuning said fly-back transformer to a higher harmonic with a frequency which is an odd number times as high as the fundamental frequency of fly-back pulses, said odd number being not less than seven;

a voltage-multiplying rectifier circuit with multiple stages connected to the secondary winding of said fly-back transformer and having at least first and second output terminals at respective different stages of said voltage-multiplying rectifier circuit; and means for deriving the plurality of high voltages of different values for the color picture tube from at least said first and second output terminals.

26. A high voltage circuit according to claim 25, wherein said odd number is not less than nine.

27. A high voltage circit according to claim 25, wherein said voltage-multiplying rectifier circuit is provided with a third output terminal at an intermediate stage thereof, voltage stabilizing means being connected between said third output terminal and a reference potential.

28. A high voltage circuit according to claim 27, wherein said means for tuning said fly-back transformer includes a resonance circuit formed of leakage inductance and distributed capacitance of said fly-back transformer.

* * * * *